(12) United States Patent
Zhou et al.

(10) Patent No.: US 8,806,858 B2
(45) Date of Patent: Aug. 19, 2014

(54) METHOD TO PROTECT THE EXHAUST MANIFOLD FROM OVERHEATING USING HEAT PIPE

(75) Inventors: Shiguang Zhou, Ann Arbor, MI (US); Michael Levin, Ann Arbor, MI (US); Furqan Zafar Shaikh, Troy, MI (US); Jeffrey Scott Hepburn, Birmingham, MI (US); Donald S. Masch, White Lake, MI (US); Zhaoyang Zeng, Windsor (CA); James Patrick O'Neill, Milford, MI (US); Danrich Henry Demitroff, Okemos, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 13/354,209

(22) Filed: Jan. 19, 2012

(65) Prior Publication Data

US 2013/0186076 A1   Jul. 25, 2013

(51) Int. Cl.
*F01N 3/00* (2006.01)
*F01N 3/02* (2006.01)
*F01N 3/20* (2006.01)

(52) U.S. Cl.
USPC .................. 60/320; 60/286; 60/298; 123/548

(58) Field of Classification Search
USPC ............................. 60/286, 298, 320; 123/548
See application file for complete search history.

(56) References Cited

U.S. PATENT DOCUMENTS

| | | | |
|---|---|---|---|
| 4,107,922 A | 8/1978 | Wössner | |
| 4,133,327 A * | 1/1979 | Inoue | 123/548 |
| 4,146,176 A * | 3/1979 | Beauvais et al. | 237/12.3 A |
| 4,545,357 A * | 10/1985 | Kearsley et al. | 123/556 |
| 4,688,537 A * | 8/1987 | Calkins et al. | 123/557 |
| 6,347,511 B1 * | 2/2002 | Haines | 60/274 |
| 7,832,204 B2 * | 11/2010 | Bidner et al. | 60/320 |
| 8,333,068 B2 * | 12/2012 | Muramatsu et al. | 60/320 |
| 2008/0141664 A1 * | 6/2008 | Bidner et al. | 60/320 |
| 2010/0146943 A1 * | 6/2010 | Muramatsu et al. | 60/286 |
| 2011/0131962 A1 * | 6/2011 | Toi et al. | 60/320 |

FOREIGN PATENT DOCUMENTS

WO   9520721   8/1995

* cited by examiner

*Primary Examiner* — Kenneth Bomberg
*Assistant Examiner* — Dapinder Singh
(74) *Attorney, Agent, or Firm* — Julia Voutyras; Alleman Hall McCoy Russell & Tuttle LLP

(57) ABSTRACT

An exhaust system for an engine is disclosed herein. The exhaust system includes a catalytic converter, an exhaust manifold upstream from the catalytic converter, and a heat pipe in thermal contact with the exhaust manifold and atmosphere. The system further includes a phase changing material that passively absorbs heat after catalytic light-off.

20 Claims, 5 Drawing Sheets

METHOD TO PROTECT THE EXHAUST MANIFOLD FROM OVERHEATING USING HEAT PIPE

BACKGROUND AND SUMMARY

Vehicles may recover exhaust heat for transfer to various other systems in an internal combustion engine.

For example, U.S. Pat. No. 4,107,922 describes an insulated heat pipe that transfers heat from an exhaust manifold to an exhaust gas reactor. The system includes an evaporative zone coupled to the exhaust manifold, a transport zone for transporting a working fluid, and a condensation zone coupled to the exhaust gas reactor. The system transfers heat from the exhaust manifold to the exhaust gas reactor during a warm-up phase of the engine. Further, the system may include a secondary heat pipe coupled to the insulated heat pipe adjacent to the condensation zone to balance an operating temperature of the exhaust gas reactor.

The inventors herein have recognized various issues with the above system. In particular, transferring heat to an emissions control device throughout engine operation increases a risk for thermal degradation of the emissions control device. For example, when the feed gas temperature exceeds a tolerable threshold, the engine may operate in enrichment mode (i.e., air:fuel<14.7) to reduce the risk of overheating a turbine (e.g., if the engine is a turbo engine including a compressor and a turbine) and/or a catalytic converter. Fuel consumption may increase to maintain the engine operating in enrichment mode. Further, the over rich fuel may increase emissions which may over burden the catalytic converter with trapped particulates (e.g., carbon monoxide). When oxygen is available, trapped particulates may be burned to purge the catalytic converter; however, a substrate of the catalytic converter may melt if the engine operates in enrichment mode for lengthy periods of time. Prior solutions have included a water jet to cool down the exhaust manifold and/or the turbo. However, the water jet also absorbs heat during cold start and thus delays the catalytic converter light-off. As such, emissions may increase due to hydrocarbons being ineffectively reduced by the catalytic converter.

As such, one example approach to address the above issues is to use a heat pipe and suitable phase changing materials to recover exhaust heat upstream from a catalytic converter and transfer the heat away from the exhaust system. In this way, it is possible to absorb heat from the exhaust system to reduce thermal degradation of the catalytic converter. Specifically, an evaporating region of the heat pipe is integrated with an exhaust manifold upstream from the catalytic converter. In some embodiments, an integrated exhaust manifold includes one or more heat pipes that facilitate heat transfer to a condensing region positioned away from the exhaust system to release thermal energy to the atmosphere. Further, the phase changing materials of the heat pipe may be selected such that thermal energy is absorbed after catalytic converter light-off is achieved. This configuration enables heat transfer without necessarily requiring the use of pumps or other mechanical components. Further, this configuration enables the level of heat transfer to be adjusted without requiring input from a control system, although adjustment via input from a control system may be advantageously used. Further, by taking advantage of the recovered exhaust heat, various other systems may be provided with heat if desired.

Note that one or more heat pipes including phase changing materials may be utilized. Further, the one or more heat pipes may be coupled to and/or integrated with various regions of the exhaust system either directly or indirectly to transfer excessive heat away from the exhaust system. Further still, various different phase changing materials with various different thermal properties may be incorporated, if desired. Therefore, one or more heat pipes may be tailored to recover heat from the exhaust system upstream from the catalytic converter without adversely affecting catalytic converter light-off.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a heat transfer system including phase changing materials, which are arranged in such a way that thermal energy from an exhaust system can be absorbed. The example arrangements described herein allow thermal energy to be absorbed and transferred away from an exhaust system. Various heat pipes may be included in the disclosed system. For example, one or more heat pipes may coupled to an exhaust manifold to thereby comprise an integrated exhaust manifold to release thermal energy to the atmosphere. In this way, the one or more heat pipes may carry heat away from the exhaust system to reduce thermal degradation of downstream exhaust system components.

Additionally, the heat transfer system may include various heat transfer fluids to extract thermal energy from the exhaust system under a variety of different operating conditions. In this way, thermal energy may be recovered from the exhaust system to provide heat to various other systems such as a cabin heating system, lubrication systems, and/or other exhaust system components, if desired.

Figure 1:
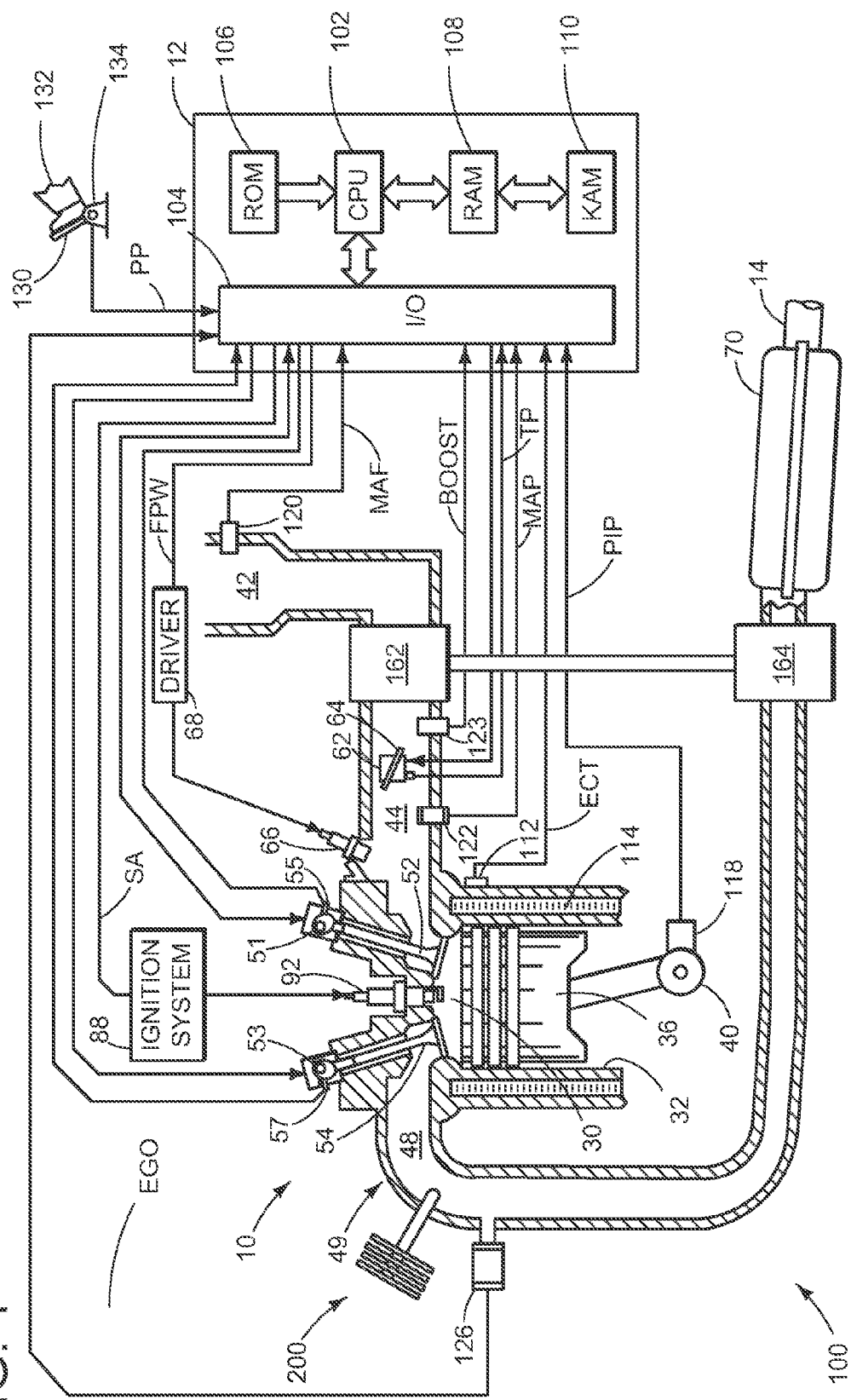
FIG. 1 schematically shows an example engine including a heat transfer system according to an embodiment of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust system 100 may include one or more components downstream from exhaust valve 54. As shown in FIG. 1, exhaust system 100 includes exhaust manifold 49, which also includes exhaust passage 48, among other exhaust passages each corresponding to another combustion cylinder, if desired. Exhaust manifold 49 may be an integrated exhaust manifold, as described further below. Exhaust system 100 may further include turbo 164 and one or more emission control devices 70 in fluidic communication of exhaust passage 48. Further still, exhaust system 100 may include tailpipe 14, downstream from the one or more emission control devices, to release exhaust gasses to the atmosphere.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), NO trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

Engine 10 may further include a heat transfer system 200 coupled to one or more exhaust system components of exhaust system 100 to absorb thermal energy. For example, the heat transfer system may include one or more heat pipes integrated with the exhaust manifold. As such, heat from the exhaust gas may be absorbed by the heat pipe and carried away from the exhaust manifold. In this way, overheating of downstream exhaust components such as catalytic converter 70 and/or turbo 164 can be reduced. Such a heat transfer system is discussed further with respect to FIGS. 2-8.

Further, heat transfer system 200 may include phase changing materials to transfer thermal energy away from the exhaust system and release the recovered thermal energy to the atmosphere. In this example, heat transfer system 200 may be arranged in such a way so as to transfer thermal energy away from exhaust system 100 upstream from catalytic converter 70. In other words, heat transfer system 200 may capture heat from exhaust feed gas instead of allowing all the thermal energy to escape to the environment via tail pipe 14. For example, heat transfer system 200 may include components in contact with exhaust system 100 to recover heat via conduction. In other words, heat transfer system 200 may include components in physical contact, and thus in thermal contact with components of exhaust system 100. Phase changing materials will be discussed in greater detail with respect to FIG. 3.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

As introduced above, under some engine operating conditions, exhaust system components and/or other engine components coupled to the exhaust system may be at risk for thermal degradation. For example, when the feed gas temperature exceeds a tolerable threshold, the engine may operate in enrichment mode (i.e., air:fuel<14.7) to reduce the risk of overheating a turbine (e.g., if the engine is a turbo engine including a compressor and a turbine) and/or a catalytic converter. Fuel consumption may increase to maintain the engine operating in enrichment mode. Further, the over rich fuel may increase emissions which may over burden the catalytic converter with trapped particulates (e.g., carbon monoxide). When oxygen is available, trapped particulates may be burned to purge the catalytic converter; however, a substrate of the catalytic converter may melt if the engine operates in enrichment mode for lengthy periods of time.

Prior solutions have included a water jet to cool down the exhaust manifold and/or the turbo. However, the water jet also absorbs heat during cold start and thus delays the catalytic converter light-off. As such, emissions may increase due to hydrocarbons being ineffectively reduced by the catalytic converter.

Figure 2:
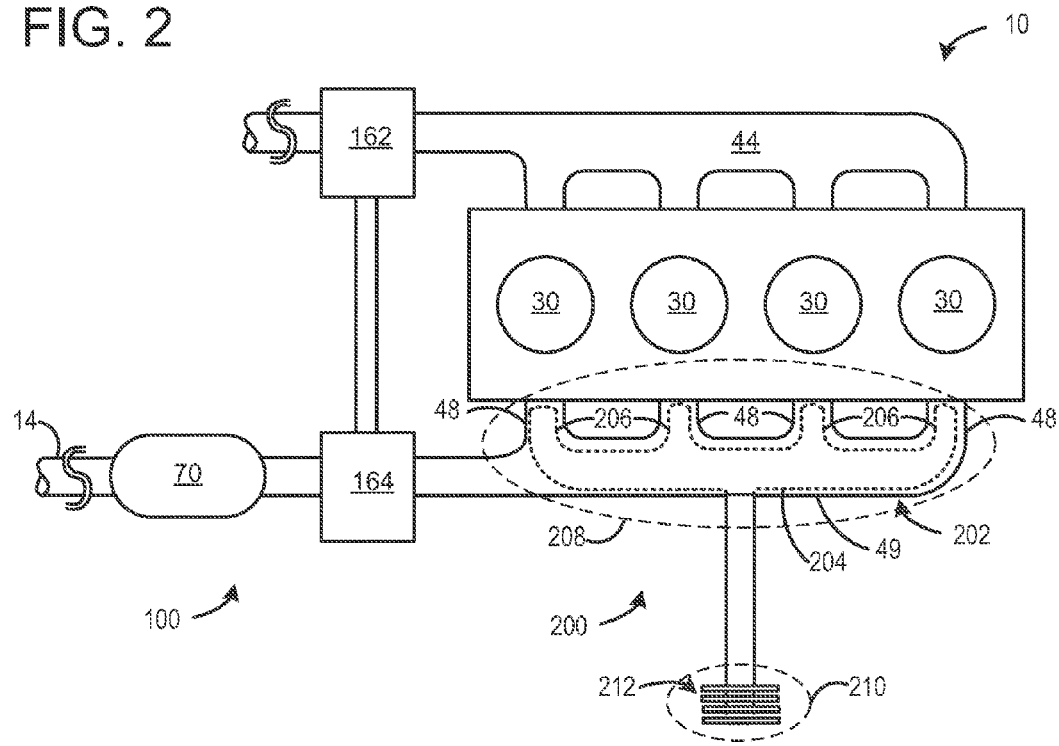
FIG. 2 schematically shows an example integrated exhaust manifold that may be included in the heat transfer system of FIG. 1.

To solve at least some of the aforementioned issues, an engine may include a heat transfer system coupled to an exhaust manifold. FIG. 2 schematically shows heat transfer system 200 thermally coupled to exhaust system 100. As shown, heat transfer system 200 includes an integrated exhaust manifold 202 positioned upstream from and catalytic converter 70. Integrated exhaust manifold 202 may also be upstream from turbine 164, when engine 10 is a turbo engine, for example. It will be appreciated that FIG. 2 includes like features as already described with respect to FIG. 1. Such features are indicated with common reference numbers and will not be discussed repetitively for the sake of brevity.

Integrated exhaust manifold 202 may include one or more components of exhaust system 100 as well as one or more components of heat transfer system 200. For example, integrated exhaust manifold 202 may include exhaust manifold 49 and one or more heat pipes 204.

It will be appreciated, that as referred to herein, the exhaust manifold is configured as both an exhaust manifold and a heat recovery device by including one or more heat pipes in thermal contact with a surface of the exhaust manifold. Further, in some embodiments, an integrated exhaust manifold is utilized. The integrated exhaust manifold incorporates a cylinder head and exhaust manifold together, where engine coolant flowing through the integrated exhaust manifold can cool not only exhaust valves and exhaust ports, but also portions of the exhaust manifold. In one particular example, the coolant flowing through the integrated exhaust manifold cools portions of the exhaust manifold where exhaust flow from a plurality of cylinders has been combined to a common flow region. Further still, heat pipes may be positioned adjacent to regions of the integrated exhaust manifold including the engine coolant passages in order to further assist in cooling the integrated exhaust manifold. Additionally, the heat pipes may be positioned in regions of the integrated exhaust manifold where there is no coolant passage (e.g., due to packaging and space constraints) in order to provide sufficient control of manifold temperatures.

Heat transfer system 200 may include phase changing materials to transfer thermal energy away from the exhaust system. In this example, heat transfer system 200 may be arranged in such a way so as to transfer thermal energy away from exhaust system 100 in a region upstream from turbine 164 and catalytic converter 70. In other words, heat transfer system 200 may cool down exhaust feed gas prior to the exhaust gas reaching turbine 164 and catalytic converter 70, in some conditions.

As shown, heat transfer system 200 may include a branched heat pipe 204. For example, portions of heat pipe 204 may closely conform to the contours of exhaust manifold 49 without obstructing exhaust gas flow. Therefore, branched heat pipe 204 may include a heat pipe branch 206 that corresponds to an exhaust passage 48 of each cylinder 30. An example heat pipe is discussed further with respect to FIG. 3.

In some embodiments, heat transfer system 200 may be positioned interior to an outer surface of exhaust manifold 49. In other embodiments, heat transfer system 200 may be positioned exterior to an outer surface of exhaust manifold 49, thus encasing exhaust manifold 49. In other words, heat transfer system 200 may be in physical contact with at least one surface (e.g., an interior surface and/or an exterior surface) of exhaust manifold 49.

Heat transfer system 200 may include an evaporative region 208 and a condenser region 210. As shown, evaporative region 208 may be contiguous with exhaust manifold 49 and condenser region 210 may extend away from exhaust manifold 49. Thus, condenser region 210 is in thermal contact with the atmosphere, and further, the condenser region may not be coupled to any vehicle component. In other words, the condenser region 210 may be contiguous with the atmosphere. As such, thermal energy may be absorbed at exhaust manifold 49 via conduction and released to the atmosphere via convection, for example. In some embodiments, condenser region 210 may be coupled to another system to provide thermal energy to that system via conduction, if desired.

Further, heat transfer system 200 may include condenser fins 212 positioned within condenser region 210 as shown. Condenser fins 212 may include a plurality of plates in thermal contact with the heat pipe within condenser region 210. As such, condenser fins 212 may increase a condensing surface area. In this way, thermal energy absorbed by heat transfer system 200 may be released to the atmosphere more efficiently.

In some embodiments, evaporative region 208 may include evaporative fins, similar to condenser fins 212. When included, the evaporative fins may include a plurality of plates in thermal contact with heat pipe branches 206 within evaporative region 208. Such evaporative fins may increase an evaporative surface area. In this way, thermal energy may be absorbed from exhaust manifold 49 more efficiently.

The phase changing material for heat transfer system 200 may be selected to evaporate at a relatively high temperature. In this way, the phase changing material is selected such that no phase change occurs at lower temperatures, and instead the phase changing material acts as a thermal insulator to support the catalytic converter light-off. When the feed gas temperature corresponds to the amount of latent heat required for the phase changing material to convert from a liquid to a vapor, the phase changing material carriers the absorbed heat to condenser 210, thus transferring heat away from exhaust manifold 49. In this way, turbine 164 and/or catalytic converter 70 may be protected from thermal degradation without affecting catalytic converter light-off.

It will be appreciated that heat transfer system 200 is provided by way of example, and thus, is not meant to be limiting. Rather, heat transfer system 200 is provided to illustrate a general concept of absorbing heat from the exhaust manifold to reduce thermal degradation of downstream exhaust components. Therefore, it is to be understood that the heat transfer system may include additional and/or alternative components than the embodiment shown in FIG. 2. Further, it is to be understood that heat transfer system 200 is not limited to the geometric configuration depicted in FIG. 2, as numerous geometric variations are possible without departing from the scope of this disclosure. For example, the heat transfer system may contact an interior surface and/or an exterior surface of exhaust manifold 49 in different ways, and thus, different heat pipe geometries may be possible without departing from the scope of this disclosure. FIGS. 4-8 illustrate various embodiments of an integrated exhaust manifold that may be included in the heat transfer system.

Figure 3:
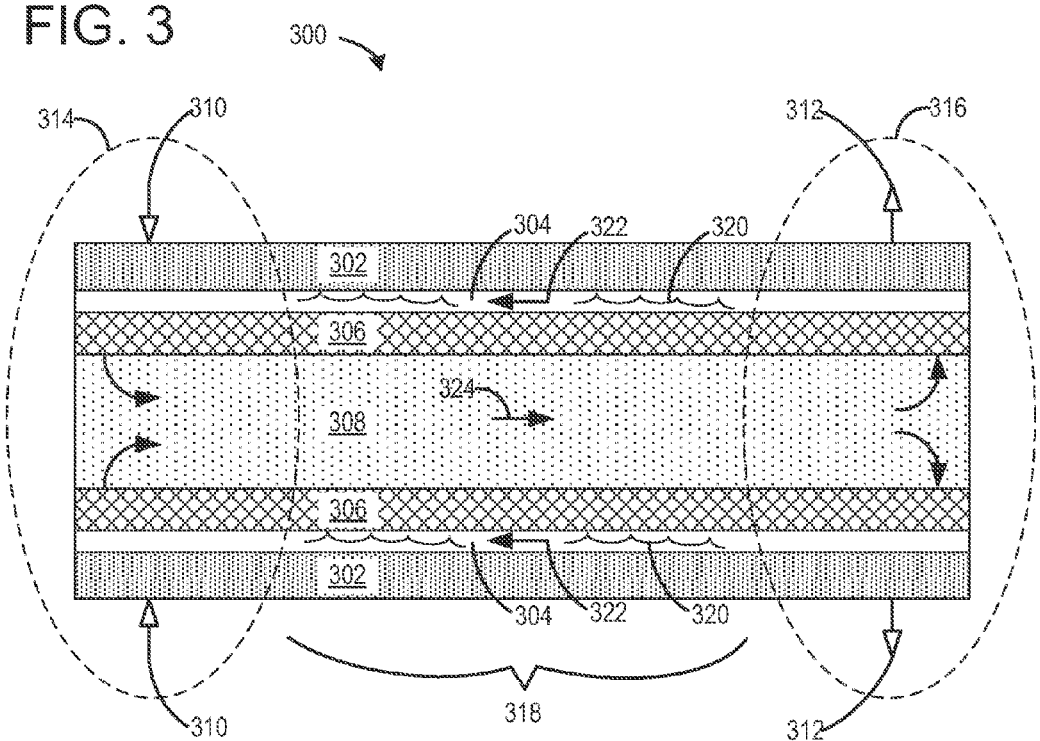
FIG. 3 schematically shows an example heat pipe that may be included in the integrated exhaust manifold of FIG. 2.

FIG. 3 schematically shows a sectional cut of a heat pipe 300 according to an embodiment of the present disclosure. For example, the sectional cut may be along a longitudinal axis of the heat pipe. At least a portion of heat pipe 300 may be a component of integrated exhaust manifold 202, as described above.

Heat pipe 300 may be any reasonable shape and is not limited to a hollow cylinder in the traditional sense of the term 'pipe.' Rather, heat pipe 300 may be generally thought of as a conduit for thermal energy transfer. As such, heat pipe 300 may assume various suitable geometries. For example, heat pipe 300 may be a branched structure or a lobed structure to closely follow a contour of exhaust manifold surface. It will be appreciated that other geometric shapes are possible without departing from the scope of this disclosure. Further, heat pipe 300 may each be a single heat pipe or a bundle of heat pipes, wherein the bundle may include more than one heat pipe packaged within a common enclosure, for example.

Heat pipe 300 may include outer shell 302, liquid film layer 304, wicking layer 306, and vapor space 308. As shown, outer shell 302 may be an external layer with liquid film layer 304 and wicking layer 306 following as successively more interior layers than outer shell 302. Finally, vapor space 308 may be an inner most layer. For example, vapor space 308 may be a central void within heat pipe 300.

Outer shell 302 may be a thermally conductive solid. For example, outer shell 302 may be a copper shell; however, other conductive solids are possible without departing from the scope of this disclosure. As a conductive solid, outer shell 302 may permit thermal energy to be passively absorbed (indicated at arrows 310) and passively released (indicated at arrows 312). As shown, thermal energy may be passively absorbed within an evaporative region 314, similar to evaporative region 208. Evaporative region 314 may correspond to a heat source, such as a component of an exhaust system, as described above. For example, evaporative region 314 may be coupled to and/or integrated with exhaust manifold 49 to absorb thermal energy via conduction. As such, evaporative region 314 may physically contact at least one surface of exhaust manifold 49. In this way, evaporative region 314 may be contiguous with exhaust manifold 49.

As shown, thermal energy may be passively released within a condenser region 316, similar to condenser region 210. Condenser region 316 may correspond to a heat sink, such as the atmosphere, as described above. In this way, condenser region 316 may release thermal energy to the atmosphere via convection. However, in some embodiments condenser region 316 may be coupled to an engine system, to provide thermal energy to a component of that system via conduction.

Adiabatic region 318 may be a region between evaporative region 310 and condenser region 312. Adiabatic region 318 may describe a region of heat pipe 300 where the net heat transfer is zero. In other words, adiabatic region 318 may not absorb or release thermal energy to/from a surrounding environment.

Liquid film layer 304 may include heat transfer fluid (HTF) 320. HTF 320 may also be referred to as a working fluid to those well versed in the art. HTF 320 may be any suitable fluid for absorbing/releasing thermal energy. Further, the particular type of HTF fluid used for a heat transfer system may be selected and tuned such that the fluid properties of the HTF appropriately match the desired thermal specifications of the one or more engine systems in communication with the heat transfer system.

HTF 320 may flow within liquid film layer 304 in a direction generally indicated by arrow 322. As shown, HTF 320 may flow from condenser region 316 to evaporative region 310. In other words, HTF 320 may flow from a cold side to a warmer side of heat pipe 300.

Wicking layer 306 may include any suitable material to assist with the migration of HTF during phase changes. For example, wicking layer 306 may assist in migrating evaporated HTF to vapor space 308 within evaporative region 310. Further, wicking layer 306 may assist in migrating condensed HTF vapor to liquid film layer 304 within condenser region 316. Therefore, wicking layer 306 may be comprised of a non-absorptive material. As one example, wicking layer 306 may include a wax coated fiber; however, other materials are possible without departing from the scope of this disclosure. In some embodiments, the HTF liquid and/or vapor may be carried between the various layers of heat pipe 300 within a separate enclosure.

Vapor space 308 may include HTF in vapor form. HTF vapor may flow within vapor space 308 in a direction generally indicated by arrow 324. As shown, HTF vapor may flow from evaporative region 310 to condenser region 316. In other words, HTF vapor may flow from a hot side to a colder side of heat pipe 300.

In this way, thermal energy may be absorbed and released by heat pipe 300. By taking advantage of phase changing materials such as HTF 320, thermal energy may be carried away from one environment and provided to another environment. Since the amount of thermal energy absorbed and released corresponds to the amount of latent energy required for a phase change of the HTF to occur, the working fluid cycles between a liquid and a vapor within heat pipe 300.

It will be appreciated that heat pipe 300 is provided by way of example, and thus, is not meant to be limiting. Therefore, it is to be understood that heat pipe 300 may include additional and/or alternative features than those illustrated in FIG.

3 without departing from the scope of this disclosure. Further, it is to be understood that heat pipe 300 may be various geometries without departing from the scope of this disclosure, and thus, is not limited to a cylindrical pipe as depicted in FIG. 3.

Figure 4:
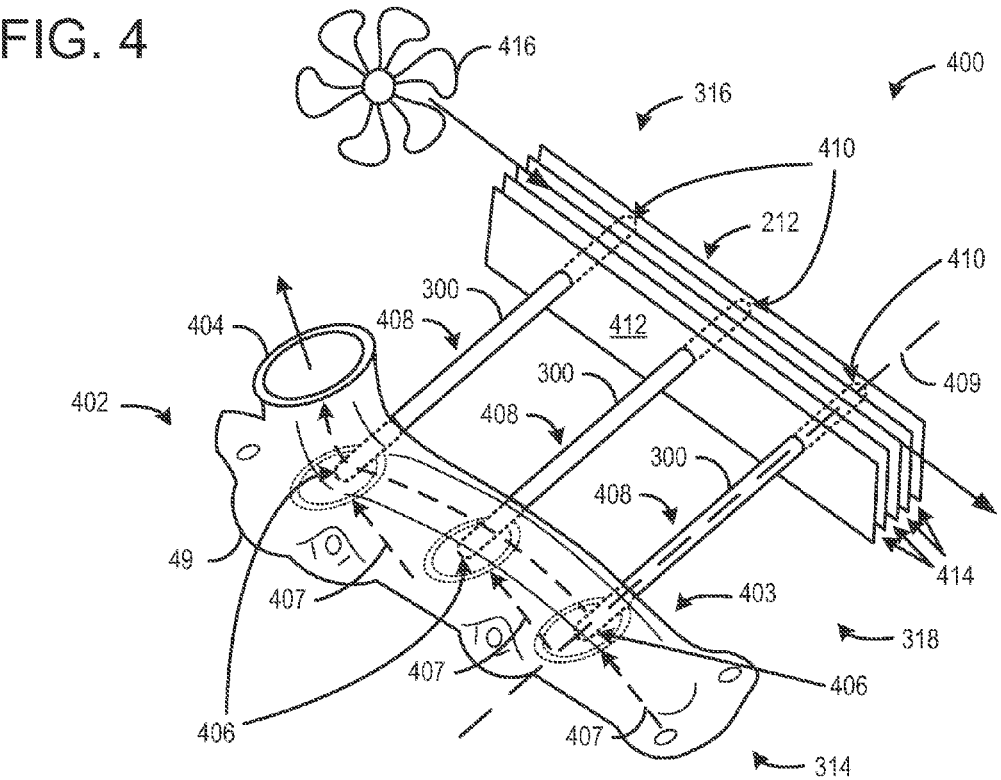
FIGS. 4-8 schematically show various embodiments of an integrated exhaust manifold that may be included in the heat transfer system of FIG. 1.

FIG. 4 schematically shows an example heat transfer system 400 including an integrated exhaust manifold 402. It will be appreciated that heat transfer system 400 may include similar features as heat transfer system 200, and further, may be in thermal communication with exhaust system 100. Further, heat transfer system 400 may include one or more heat pipes 300. Thus, it will be appreciated that such features are indicated with common reference numbers and will not be discussed repetitively for the sake of brevity.

As shown, heat transfer system 400 may be coupled to exhaust manifold 49. As described above, the combination of one or more heat pipes 300 and exhaust manifold 49 in thermal contact may comprise integrated exhaust manifold 402.

Heat transfer system 400 includes three heat pipes 300 thermally coupled to exhaust manifold 49. For example, each heat pipe may coincide with an exhaust port. As referred to herein, the exhaust port is a region of exhaust passage 48 downstream from an exhaust valve (e.g., exhaust valve 54) and upstream from a converging region (e.g., outlet 404) of exhaust manifold 49. Thus, exhaust manifold 49 may include an exhaust port coinciding with each combustion chamber. In this example, exhaust manifold 49 includes three exhaust ports, wherein each exhaust port includes a portion of a heat pipe. However, it will be appreciated that exhaust manifold 49 may include more or less than three exhaust ports, and likewise a corresponding number of heat pipes.

As described above, each heat pipe 300 includes evaporative region 314, adiabatic region 318, and condenser region 316. As shown, at least a portion 406 of evaporative region 314 is interior to exhaust manifold 49. For example, the interior portion of each heat pipe may be positioned within a corresponding exhaust port. Further, each heat pipe 300 may insert into the corresponding exhaust port through a top exterior surface 403 of exhaust manifold 49. In other words, the evaporating region may be positioned within an interior space of the exhaust manifold within the exhaust port. In some embodiments, the heat pipes may be arranged such that interior portions 406 are orthogonal to an exhaust gas flow direction (indicated generally by arrows 407) through the exhaust ports. In other words, a longitudinal axis 409 of each heat pipe may be orthogonal to the top surface of exhaust manifold 49. In this way, evaporative regions 314 may be positioned within the exhaust ports such that thermal energy can be absorbed via convection from the exhaust gases flowing around an exterior surface of the interior portions of heat pipes 300. It will be appreciated that the interior portions of heat pipes 300 may be inserted such that exhaust gas flow is substantially unobstructed.

Figure 5:
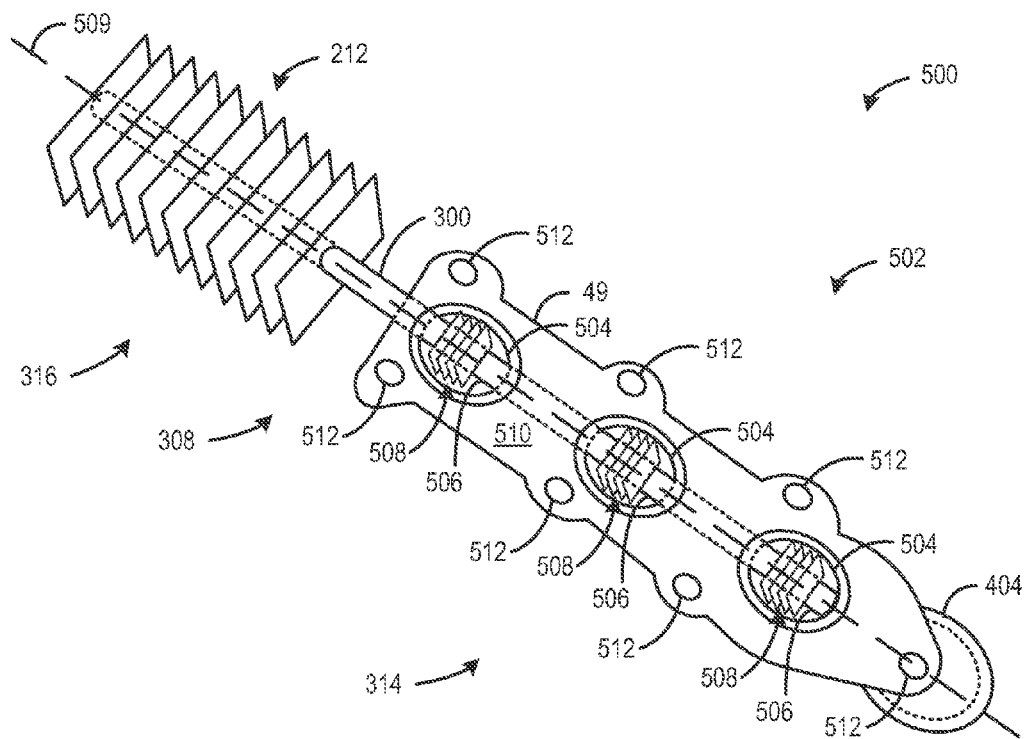

In some embodiments, portions 406 may be in thermal contact with a plurality of evaporator fins. Each evaporator fin may be positioned in parallel with the exhaust gas flow so as to not obstruct the exhaust gas flow. Instead, the evaporator fins may be optionally included to increase a surface area of evaporative regions 314. The evaporator fins may be comprised of a conductive material and each evaporator fin may be a substantially thin plate with sufficient spacing between evaporator fins such that exhaust gases flow between the evaporator fins unobstructed. An example of such evaporator fins is depicted in FIG. 5.

As shown, heat transfer system 400 includes condenser fins 212, as described above. As shown, condenser regions 316 may be coupled to condenser fins 212 such that the condenser regions are orthogonal to a surface 412 of the condenser fins. Condenser fins 212 may be in thermal contact with condenser regions 316 such that thermal energy from condenser regions 316 can be transferred to condenser fins 212 via conduction. In this way, condenser fins 212 increase a surface area of the condenser region and release thermal energy to the atmosphere. As shown, a void 414 may be positioned between adjacent condenser fins such that thermal energy in the form of vapor can be released to the atmosphere from a surface of each condenser fins 212 and/or from condensing regions 316 of heat pipes 300. It will be appreciated that heat transfer system 400 may include another number of condenser fins, and thus, is not limited to the five condenser fins illustrated in FIG. 4. For example, heat transfer system 400 may include more or less than five condenser fins, if desired.

As shown, heat transfer system 400 may optionally include one or more cooling fans 416 to increase a rate of convection from condenser fins 212 and condenser regions 316. In some embodiments, heat transfer system 400 may not include a cooling fan.

It will be appreciated that heat transfer system 400 is provided by way of example, and thus, is not meant to be limiting. Therefore, it is to be understood that heat transfer system 400 may include additional and/or alternative features than those illustrated in FIG. 4 without departing from the scope of this disclosure. Further, it is to be understood that heat transfer system 400 may include various geometries without departing from the scope of this disclosure, and thus, is not limited to the embodiment illustrated in FIG. 4.

FIG. 5 schematically shows an example heat transfer system 500. It will be appreciated that heat transfer system 500 may include similar features as heat transfer systems 200 and/or 400, and further, may be in thermal communication with exhaust system 100. Further, heat transfer system 500 may include one or more heat pipes 300. Thus, it will be appreciated that such features are indicated with common reference numbers and will not be discussed repetitively for the sake of brevity.

As shown, heat transfer system 500 may be coupled to exhaust manifold 49. As described above, the combination of heat pipe 300 and exhaust manifold 49 in thermal contact may comprise integrated exhaust manifold 502.

Heat transfer system 500 includes a single heat pipe 300 thermally coupled to exhaust manifold 49. As shown, heat pipe 300 crosses all exhaust ports 504. For example, evaporator region 314 may cross all exhaust ports 504. Further, at least a portion 506 of the evaporative region may be interior to exhaust manifold 49. For example, each interior portion 506 of heat pipe 300 may be positioned within a corresponding exhaust port 504. It will be appreciated that other portions of evaporator region 314 may not be interior to exhaust manifold 49. For example, some portions between the exhaust ports 504 may be exterior to the exhaust manifold, in some embodiments. However, such portions between the exhaust ports 504 may be interior to the exhaust manifold, if desired.

In this example, heat pipe 300 is positioned orthogonal to an exhaust gas flow direction through all exhaust ports 504. In other words, a longitudinal axis 509 of heat pipe 300 may be orthogonal to a cylinder head side surface 510 of exhaust manifold 49. For example, cylinder head side surface 510 may be a surface that is coupled to a cylinder head when exhaust manifold 49 is attached to an engine (e.g., engine 10). Further, exhaust manifold 49 may include a plurality of apertures 512 for fastening exhaust manifold 49 to the engine via a fastening device (e.g., a bolt, a screw, etc.).

In this way, evaporative region 314 is positioned within all exhaust ports 504 such that thermal energy can be absorbed via convection from the exhaust gases flowing around an exterior surface of interior portions 506 and evaporative fins 508. It will be appreciated that the interior portions of heat pipes 300 may be inserted such that exhaust gas flow is substantially unobstructed.

As shown, portions 506 may be thermally coupled to one or more evaporator fins 508. As described above, each evaporator fin 506 may be positioned in parallel with the exhaust gas flow so as to not obstruct the exhaust gas flow. Instead, the evaporator fins increase a surface area of evaporative regions 314. The evaporator fins may be comprised of a conductive material and each evaporator fin may be a substantially thin plate with sufficient spacing between evaporator fins such that exhaust gases flow between the evaporator fins unobstructed. Further, heat transfer system 500 may include condenser fins 212, as described above.

It will be appreciated that heat transfer system 500 is provided by way of example, and thus, is not meant to be limiting. Therefore, it is to be understood that heat transfer system 500 may include additional and/or alternative features than those illustrated in FIG. 5 without departing from the scope of this disclosure. Further, it is to be understood that heat transfer system 500 may include various geometries without departing from the scope of this disclosure, and thus, is not limited to the embodiment illustrated in FIG. 5.

Figure 6:
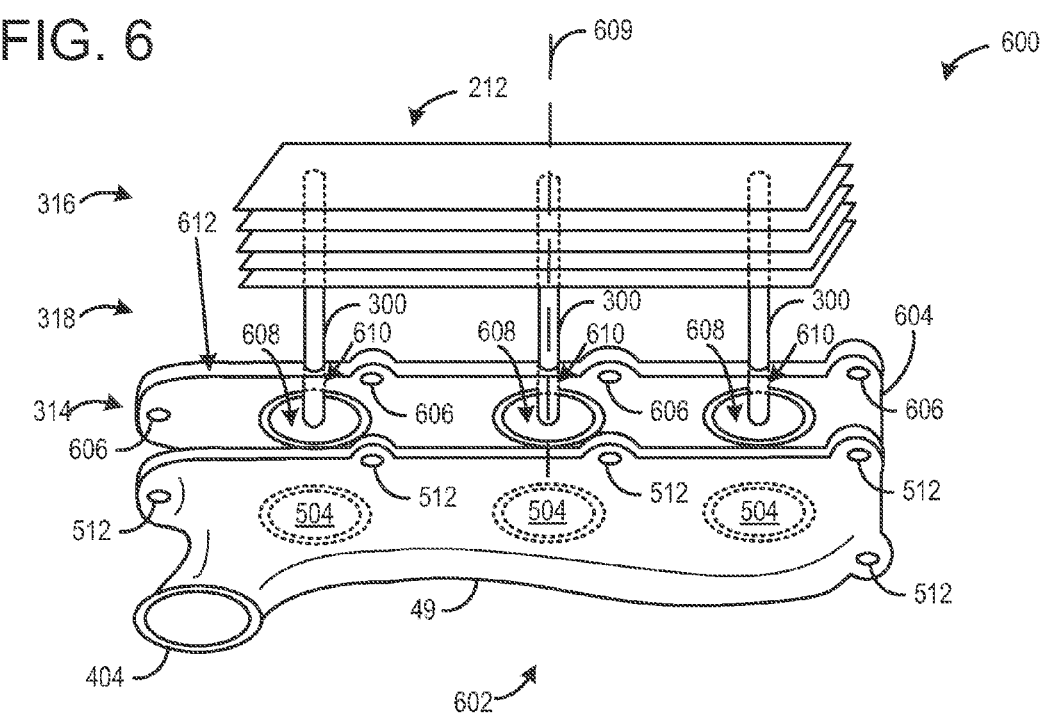

FIG. 6 schematically shows an example heat transfer system 600. It will be appreciated that heat transfer system 600 may include similar features as heat transfer systems 200, 500 and/or 600, and further, may be in thermal communication with exhaust system 100. Further, heat transfer system 600 may include one or more heat pipes 300. Thus, it will be appreciated that such features are indicated with common reference numbers and will not be discussed repetitively for the sake of brevity.

As shown, heat transfer system 600 may be coupled to exhaust manifold 49. As described above, the combination of one or more heat pipes 300 and exhaust manifold 49 in thermal contact may comprise integrated exhaust manifold 602.

Heat transfer system 600 includes three heat pipes 300 thermally coupled to an adapter 604. For example, adapter 604 may be positioned between exhaust manifold 49 and a cylinder head, when exhaust manifold 49 is attached to the engine. Thus, apertures 512 may align with apertures 606 of adapter 604. Further, it is to be understood that both apertures 512 and 606 align with corresponding apertures of the cylinder head. Likewise, exhaust ports 504 align with corresponding adapter ports 608, and further align with an exhaust passage 48 for each combustion cylinder.

As shown, portions 610 of each heat pipe 300 may be positioned within an interior of adapter 604, such that evaporative regions 314 are projected at least partially through each aperture port 608. Further, each heat pipe 300 may insert through adapter 604 at a top surface 612 of the adapter. Thus, evaporative regions 314 may be positioned such that exhaust gas flows in a direction orthogonal to longitudinal axis 609. In other words, evaporative regions 314 may be positioned such that heat pipes 300 are orthogonal to top surface 612. It will be appreciated that the evaporative regions may be inserted into adapter 604 such that exhaust gas flow is substantially unobstructed.

In some embodiments, evaporative regions 314 may include one or more evaporator fins, as described above. Further, heat transfer system 600 may include condenser fins 212, as shown.

It will be appreciated that heat transfer system 600 is provided by way of example, and thus, is not meant to be limiting. Therefore, it is to be understood that heat transfer system 600 may include additional and/or alternative features than those illustrated in FIG. 6 without departing from the scope of this disclosure. Further, it is to be understood that heat transfer system 600 may include various geometries without departing from the scope of this disclosure, and thus, is not limited to the embodiment illustrated in FIG. 6.

Figure 7:
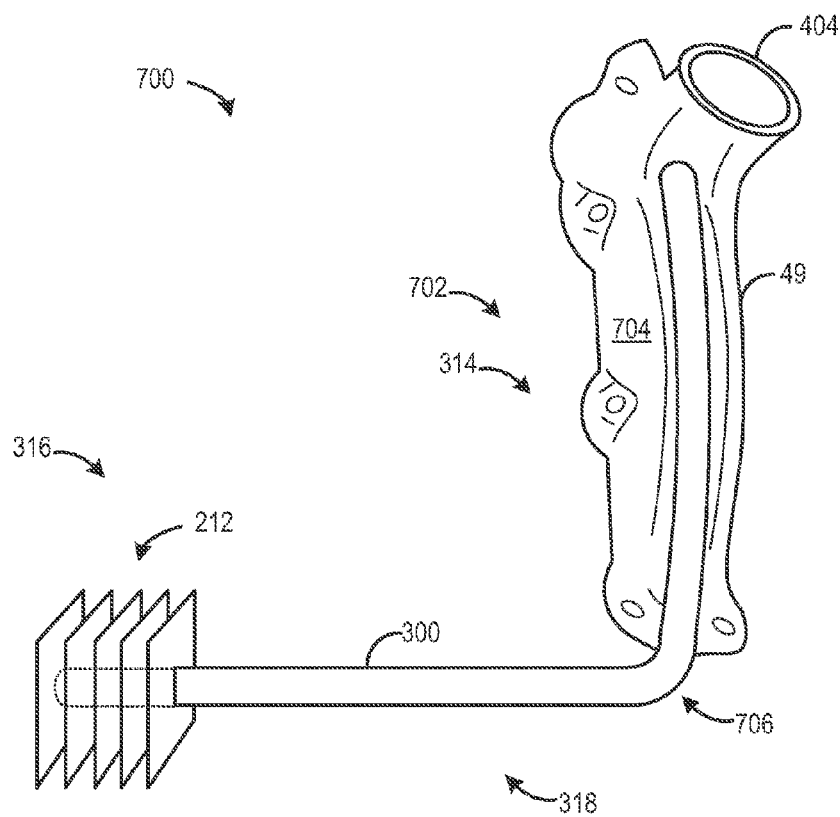

FIG. 7 schematically shows an example heat transfer system 700. It will be appreciated that heat transfer system 700 may include similar features as heat transfer systems 200, 500, 600 and/or 700, and further, may be in thermal communication with exhaust system 100. Further, heat transfer system 700 may include one or more heat pipes 300. Thus, it will be appreciated that such features are indicated with common reference numbers and will not be discussed repetitively for the sake of brevity.

As shown, heat transfer system 700 may be coupled to exhaust manifold 49. As described above, the combination of heat pipe 300 and exhaust manifold 49 in thermal contact may comprise integrated exhaust manifold 702.

Heat transfer system 700 includes a single heat pipe 300 thermally coupled to an exterior surface 704 of exhaust manifold 49. For example, evaporative region 314 may be coupled to exterior surface 704 to adsorb thermal energy via conduction. It will be appreciated that heat pipe 300 may be in physical contact with various external surfaces of exhaust manifold 49. In this example, heat pipe 300 may be in physical contact (and thus in thermal contact) with exterior surface 704 which is not the cylinder head side surface of exhaust manifold 49.

In this example, heat pipe 300 includes a bend 706. In some embodiments, heat pipe 300 may include more than one bend. Alternative, heat pipe 300 may be configured without the bend, if desired.

It will be appreciated that heat transfer system 700 is provided by way of example, and thus, is not meant to be limiting. Therefore, it is to be understood that heat transfer system 700 may include additional and/or alternative features than those illustrated in FIG. 7 without departing from the scope of this disclosure. Further, it is to be understood that heat transfer system 700 may include various geometries without departing from the scope of this disclosure, and thus, is not limited to the embodiment illustrated in FIG. 7.

Figure 8:
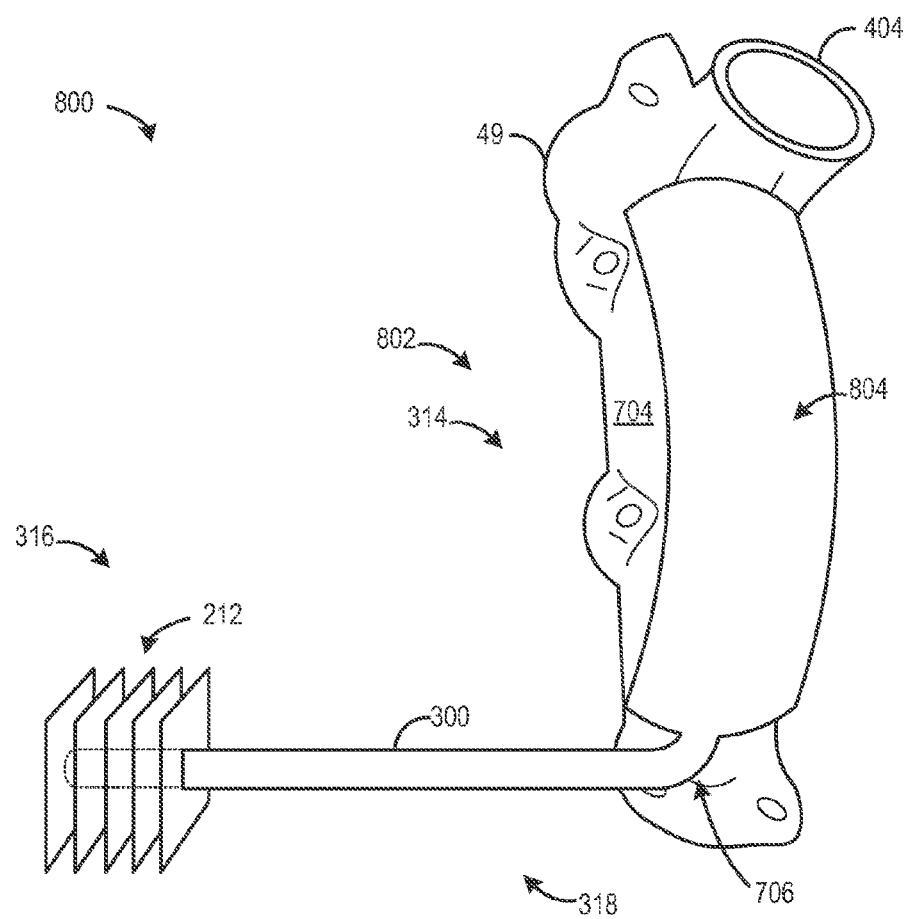

FIG. 8 schematically shows an example heat transfer system 800. It will be appreciated that heat transfer system 800 may include similar features as heat transfer systems 200, 500, 600, 700 and/or 800, and further, may be in thermal communication with exhaust system 100. Further, heat transfer system 800 may include one or more heat pipes 300. Thus, it will be appreciated that such features are indicated with common reference numbers and will not be discussed repetitively for the sake of brevity.

As shown, heat transfer system 800 may be coupled to exhaust manifold 49. As described above, the combination of heat pipe 300 and exhaust manifold 49 in thermal contact may comprise integrated exhaust manifold 802.

Heat transfer system 800 includes a single heat pipe 300 thermally coupled to exterior surface 704, similar to heat transfer system 700. As shown, evaporative region 314 of heat pipe 300 may be configured as a heat plate 804. Heat plate 804 may have a larger surface area for thermally contacting exhaust manifold as compared to heat transfer system 700, for example. It will be appreciated that heat plate 804 may be have a similar structure as heat pipe 300, and may only differ in geometric shape. As shown, heat pipe 804 may be an oblong shape; however, other geometries are possible without departing from the scope of this disclosure. For example, heat plate 804 may be an irregular shape that physically contacts the entire exterior surface 704. Alternatively, heat plate 804 may be an irregular shape that contacts less than the entire exterior surface 704. As another example, heat plate 804 may be various regular shapes that physically contact the entire exterior surface 704 or less than the entire exterior surface 704.

It will be appreciated that heat transfer system 800 is provided by way of example, and thus, is not meant to be limiting. Therefore, it is to be understood that heat transfer system 800 may include additional and/or alternative features than those illustrated in FIG. 8 without departing from the scope of this disclosure. Further, it is to be understood that heat transfer system 800 may include various geometries without departing from the scope of this disclosure, and thus, is not limited to the embodiment illustrated in FIG. 8.

They systems described herein utilize a heat pipe in different ways to recover thermal energy that would otherwise be detrimental to downstream system components. For example, thermal energy may be averted away from exhaust system to protect downstream components from thermal degradation, as described above.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system for an engine, comprising:
a catalytic converter;
an exhaust manifold upstream from the catalytic converter; and
a single heat pipe in thermal contact with the exhaust manifold at an evaporative region and atmosphere at a condenser region, the heat pipe including a phase changing material that passively absorbs heat after catalytic light-off and a vapor space and liquid film layer separated by a wicking layer.

2. The exhaust system of claim 1, wherein the heat pipe is in thermal contact with an interior space of the exhaust manifold and wherein the heat pipe is branched, with portions of the heat pipe conforming to contours of the exhaust manifold.

3. The exhaust system of claim 1, wherein the heat pipe is inserted through an exterior surface of the exhaust manifold, wherein the heat pipe is further positioned upstream of a turbocharger, and wherein the phase changing material allows a level of heat transfer of the heat pipe to be adjusted without requiring input from a control system.

4. The exhaust system of claim 3, wherein the evaporative region of the heat pipe is positioned within an exhaust port of the exhaust manifold, and wherein a longitudinal axis of the heat pipe is orthogonal to an exhaust gas flow.

5. The exhaust system of claim 1, wherein the evaporative region is in thermal contact with an exterior surface of the exhaust manifold.

6. The exhaust system of claim 5, wherein the heat pipe includes a heat plate in thermal contact with the exterior surface of the exhaust manifold.

7. The exhaust system of claim 6, wherein the heat plate has a larger surface area than other portions of the heat pipe.

8. The exhaust system of claim 1, wherein the heat pipe includes a bend, wherein the condenser region is in thermal contact and continuous with atmosphere, and wherein the condenser region is not coupled to any vehicle component.

9. An integrated exhaust manifold for an engine, comprising:
an exhaust manifold including exhaust ports;
a plurality of heat pipes, each heat pipe including an evaporative region in thermal contact with the exhaust manifold through one of the exhaust ports, a phase changing material that passively absorbs heat after catalytic light-off, a vapor space and liquid film layer separated by a wicking layer and a condenser region contiguous with atmosphere, an interior portion of the evaporative region of each heat pipe positioned within an interior of a corresponding exhaust port; and
a plurality of condenser fins coupled to the condenser region of each heat pipe.

10. The integrated exhaust manifold of claim 9, wherein the evaporative region of each heat pipe is in thermal contact with one or more evaporative fins.

11. The integrated exhaust manifold of claim 9, wherein gases flowing through each exhaust port flow around an exterior surface of the interior portion of each corresponding heat pipe.

12. The integrated exhaust manifold of claim 11, wherein a longitudinal axis of the heat pipe is orthogonal to an exhaust gas flow direction through the exhaust port.

13. The integrated exhaust manifold of claim 9, wherein the heat pipe includes an outer shell, a working fluid layer, a wicking layer, and a vapor space, liquid working fluid flowing within the working fluid layer and condensed working fluid flowing within a vapor space.

14. The integrated exhaust manifold of claim 9, further comprising a cooling fan positioned adjacent to the plurality of condenser fins.

15. A heat transfer system for an engine, comprising:
a heat pipe including an evaporative region inserted through an exterior surface of an exhaust manifold and into an interior of the exhaust manifold, a condensing region extending away from the exhaust manifold, a phase changing material that passively absorbs heat after catalytic light-off, a vapor space and liquid film layer separated by a wicking layer, the heat pipe having a longitudinal axis that is orthogonal to an exhaust gas flow direction through an exhaust port; and
a plurality of condenser fins in thermal contact with the condensing region.

16. The heat transfer system of claim 15, wherein the heat pipe is a single heat pipe and inserts through a plurality of exhaust ports, the single heat pipe crossing and positioned within all exhaust ports of the plurality of exhaust ports.

17. The heat transfer system of claim 15, further comprising an adapter that aligns with the exhaust manifold at a position between the exhaust manifold and a cylinder head when the exhaust manifold is attached to an engine.

18. The heat transfer system of claim 17, wherein the heat pipe inserts through a top surface of the adapter and the evaporative region is positioned within an adapter port that aligns with the exhaust port such that the longitudinal axis is orthogonal to the exhaust gas flow.

19. The heat transfer system of claim 15, further comprising one or more evaporative fins in thermal contact with the evaporating region to increase a surface area of the evaporating region.

20. The heat transfer system of claim 15, further comprising a fan adjacent to the plurality of condenser fins to increase a rate of convection.

\* \* \* \* \*